US012440598B2

(12) United States Patent
Harimoto et al.

(10) Patent No.: US 12,440,598 B2
(45) Date of Patent: Oct. 14, 2025

(54) MEDICAL MOLDED ARTICLE, MEDICAL DEVICE, AND NERVE GUIDANCE CONDUIT

(71) Applicant: Toray Industries, Inc., Tokyo (JP)

(72) Inventors: Kenichi Harimoto, Otsu (JP); Hirokazu Sakaguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 803 days.

(21) Appl. No.: 17/292,809

(22) PCT Filed: Dec. 11, 2019

(86) PCT No.: PCT/JP2019/048392
§ 371 (c)(1),
(2) Date: May 11, 2021

(87) PCT Pub. No.: WO2020/122096
PCT Pub. Date: Jun. 18, 2020

(65) Prior Publication Data
US 2021/0393847 A1 Dec. 23, 2021

(30) Foreign Application Priority Data
Dec. 13, 2018 (JP) ................. 2018-233153

(51) Int. Cl.
A61L 17/12 (2006.01)
A61L 27/18 (2006.01)
A61L 27/58 (2006.01)
A61L 31/06 (2006.01)
A61L 31/14 (2006.01)

(52) U.S. Cl.
CPC ............. A61L 17/12 (2013.01); A61L 27/18 (2013.01); A61L 27/58 (2013.01); A61L 31/06 (2013.01); A61L 31/148 (2013.01); A61L 2430/22 (2013.01); A61L 2430/32 (2013.01)

(58) Field of Classification Search
CPC ................. C08L 67/04; A61L 17/12
See application file for complete search history.

(56) References Cited

U.S. PATENT DOCUMENTS

| 8,674,033 | B2 | 3/2014 | Hissink et al. | |
| 9,504,768 | B2 | 11/2016 | Fujita et al. | |
| 2014/0025161 | A1* | 1/2014 | Stankus | A61F 2/86 623/1.19 |
| 2014/0187855 | A1* | 7/2014 | Nagale | A61L 31/16 128/834 |

FOREIGN PATENT DOCUMENTS

| JP | 06501045 A | 1/1994 |
| JP | 2000143781 A | 5/2000 |
| JP | 2005533148 A | 11/2005 |
| JP | 2006183042 A | 7/2006 |
| JP | 2006326088 A | 12/2006 |
| JP | 2007046050 A | 2/2007 |
| JP | 2016195642 A | 11/2016 |
| WO | 2013146999 A1 | 10/2013 |

OTHER PUBLICATIONS

PakFactory: PLA, https://pakfactory.com/polylactic-acid.html, 1 page.*
Ajami-Henriquez et al., J Biomedical Materials Research, 87A, 2008, 405-417.*
Japanese Notice of Reasons for Refusal for Japanese Application No. 2019-569515, dated Nov. 30, 2023 with translation, 9 pages.
International Search Report and Written Opinion for International Application No. PCT/JP2019/048392, dated Jan. 28, 2020, 6 pages.

* cited by examiner

Primary Examiner — Kyle A Purdy
(74) Attorney, Agent, or Firm — Buchanan Ingersoll & Rooney PC

(57) ABSTRACT

The present invention provides a medical molded article including a bioabsorbable polyester and having excellent followability to a living body, and the present invention is a medical molded article including a bioabsorbable polyester, the medical molded article having an amount-of-work-holding rate of 55% or more, the amount-of-work-holding rate defined as a rate of an amount of work generated finally by an operation that is repeated 10 times to an amount of work generated first by the operation, the operation in which a tensile stress is applied to the medical molded article in a direction of a maximum length of the medical molded article to generate a tensile strain of 100% with respect to an initial length.

10 Claims, 3 Drawing Sheets

MEDICAL MOLDED ARTICLE, MEDICAL DEVICE, AND NERVE GUIDANCE CONDUIT

CROSS REFERENCE TO RELATED APPLICATIONS

This is the U.S. National Phase application of PCT/JP2019/048392, filed Dec. 11, 2019, which claims priority to Japanese Patent Application No. 2018-233153, filed Dec. 13, 2018, the disclosures of each of these applications being incorporated herein by reference in their entireties for all purposes.

FIELD OF THE INVENTION

The present invention relates to a medical molded article including a bioabsorbable polyester, used as a material for medical devices that are, for use, placed inside and outside the living body, such as sutures, stents, artificial blood vessels, anti-adhesion films, damage protective films, and nerve guidance conduits.

BACKGROUND OF THE INVENTION

Medical molded articles produced by molding a resin into a form such as a film, tube, coil, needle, thread, or screw form are used as medical devices used, in the case that tissues inside and outside the living body are damaged, for the purpose of filling the space generated by the damage, fixing or protecting the damaged part, connecting or separating the damaged tissues, or the like. Among the medical molded articles, those including a bioabsorbable material decompose and replace the own tissue after transplantation, therefore, such medical molded articles are less likely to be recognized as a foreign substance or cause an inflammatory reaction even when transplanted into a living body. Furthermore, the medical molded articles including a bioabsorbable material are not to be removed by reoperation, thus allowing improvement in the quality of life (QOL) of patients. Therefore, the medical molded articles including a bioabsorbable material have been recently used as various medical devices.

As such a bioabsorbable material, polylactic acid, polyglycolic acid, polycaprolactone, and bioabsorbable polyesters that are a copolymer of the above-described polymers have attracted attention. However, molded articles of such a bioabsorbable polyester are generally fragile. Therefore, for improvement of the mechanical property to obtain a bioabsorbable polymer having strength and moldability adequate for practical use, development of high molecular weight polymers and various copolymers has been attempted.

For example, Patent Document 1 discloses a method of synthesizing polylactic acid and polyglycolic acid, which has conventionally employed polycondensation, in which lactide and glycolide are first manufactured from lactic acid and glycolic acid to obtain a polymer having a further high molecular weight, and the lactide and the glycolide are subjected to ring-opening polymerization to synthesize polylactic acid and polyglycolic acid.

Many attempts have also been made to develop new multi-block copolymers produced by combining polylactic acid, which is brittle due to its high crystallinity, with another highly movable polymer. For example, Non-Patent Document 1 describes a multi-block copolymer obtained by connecting a polylactic acid-based polymer obtained by reacting lactide with hexanediol to polycaprolactone having hydroxyl groups at both the terminals. Patent Document 2 discloses a multi-block copolymer having a first block including polylactic acid having hydroxyl groups at both the terminals and a second block including a polymer more movable than polylactic acid, and thus having a further improved mechanical property without deterioration of the bioabsorbable property.

PRIOR ART DOCUMENTS

Patent Documents

Patent Document 1: Japanese Patent Laid-open Publication No. 6-501045
Patent Document 2: Japanese Patent Laid-open Publication No. 2006-183042

Non-Patent Document

Non-Patent Document 1: Oju Jeon, et al., Macromolecules 2003, 36, 5585-5592

SUMMARY OF THE INVENTION

A living body has innumerable portions to which multiple physical actions such as flexion, stretch, and compression are applied by the movement of muscles and joints. In such an environment, a medical molded article having high followability to a living body is to be used so that the above-described medical devices can exhibit their functions required. The molded article in which the bioabsorbable polyester described in Patent Document 2 or Non-Patent Document 1 is used has more excellent mechanical strength than a molded article of a homopolymer such as simple polylactic acid, but has poor followability to a living body due to the hardness. The poor followability sometimes causes falling of the molded article from the placement location or rather causes damage of the surrounding tissue.

An object of the present invention is to provide a medical molded article including a bioabsorbable polyester and having excellent followability to a living body.

The present invention according to exemplary embodiments to solve the above-described problems is a medical molded article including a bioabsorbable polyester, the medical molded article having an amount-of-work-holding rate of 55% or more, the amount-of-work-holding rate defined as a rate of an amount of work generated finally by an operation that is repeated 10 times to an amount of work generated first by the operation, the operation in which a tensile stress is applied to the medical molded article in a direction of a maximum length of the medical molded article to generate a tensile strain of 100% with respect to an initial length.

By using the medical molded article including a bioabsorbable polyester having excellent followability to a living body according to the present invention, a medical device having further high biocompatibility can be produced.

DETAILED DESCRIPTION OF EMBODIMENTS OF THE INVENTION

Figure 1:
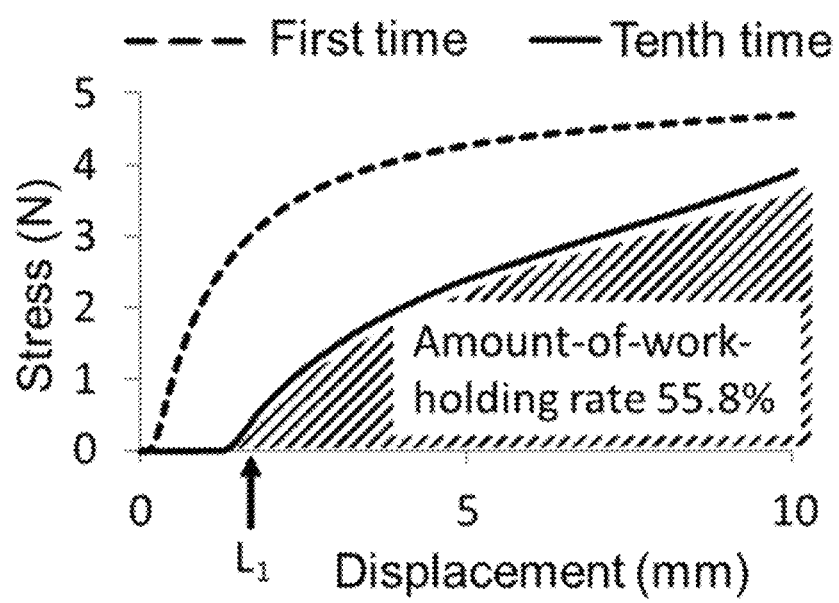
FIG. 1 is a graph showing the amount-of-work-holding rate by plotting stress against displacement in the tensile test in Example 3.

The medical molded article according to embodiments of the present invention (hereinafter, sometimes simply referred to as "molded article") has an amount-of-work-holding rate of 55% or more, the amount-of-work-holding rate defined as a rate of an amount of work generated finally by an operation that is repeated 10 times to an amount of work generated first by the operation, the operation in which a tensile stress is applied to the medical molded article in a direction of a maximum length of the medical molded article to generate a tensile strain of 100% with respect to an initial length. The amount-of-work-holding rate is specifically to be measured by the tensile test described in Measurement Example 5 described below.

A medical molded article is placed inside and outside the living body. Therefore, a medical molded article including a material having a too high Young's modulus may damage the tissue around the placement location by compression, scratch, or puncture when external force is applied to the molded article due to deformation such as bend or curvature. Therefore, assuming that hard tissue such as bone is located around the placement location, the molded article preferably has a Young's modulus of 10 MPa or less. If no hard tissue is located around the placement location, the molded article more preferably has a Young's modulus of 5.0 MPa or less, and still more preferably 3.0 MPa or less so that the Young's modulus is further close to that of the soft tissue. Meanwhile, if the molded article has a too low Young's modulus, the molded article cannot maintain the form when external force is applied to the molded article due to deformation such as bend or curvature. Therefore, the Young's modulus is preferably 0.1 MPa or more, and more preferably 0.5 MPa or more. In particular in the case of the molded article used for the purpose of connecting tissues, the Young's modulus is preferably 1.0 MPa or more.

The tensile strength is a factor directly connecting with the breaking-resistant strength of the molded article. Assuming that the medical molded article is used in a part where external force is applied due to deformation such as muscle expansion or contraction, the medical molded article preferably has a tensile strength of 5 MPa or more. In the case of the medical molded article used in a part where further severe deformation such as bend or curvature occurs, the tensile strength is preferably 20 MPa or more.

The rupture elongation is a factor indicating the breaking-resistant strength of the molded article. Assuming that the medical molded article is used in a part where external force is applied due to muscle expansion or contraction, vibration, or the like, the medical molded article preferably has a rupture elongation of 200% or more. In the case of the medical molded article used in a part where further severe deformation such as bend or curvature occurs, the rupture elongation is more preferably 500% or more. In the case of the medical molded article used in a part such as a joint where particularly large deformation occurs due to bend or curvature, the rupture elongation is still more preferably 1,000% or more. The rupture elongation is a value measured in accordance with JIS K6251 (2010) (referred to as "elongation at break" in JIS), and is specifically measured by the tensile test described in Measurement Example 3 described below.

The medical molded article according to embodiments of the present invention is, for use, placed inside or outside the living body. Therefore, the medical molded article needs to have a recovering property so that the form deformed by external force due to the movement of a muscle or a joint returns to its original form. The recovering property can be quantitatively evaluated by determining the amount-of-work-holding rate as in Measurement Example 5 described below. The term "amount-of-work-holding rate" refers to the rate obtained by performing an operation in which a tensile stress is applied to the medical molded article in the direction of the maximum length of the medical molded article to generate a tensile strain of 100% with respect to the initial length. The amount-of-work-holding rate is the rate of the amount of work generated finally by the operation that is repeated 10 times to the amount of work generated first by the operation, and can be specifically calculated by the method described in Measurement Example 5 described below. The closer the amount-of-work-holding rate of the medical molded article is to 100%, the less likely the medical molded article is to lose, by deformation, the required functions such as filling of space and fixing, connection, and separation of tissues. The medical molded article used near a muscle is frequently deformed. Therefore, the medical molded article according to embodiments of the present invention has an amount-of-work-holding rate of 55% or more, and in the case of the medical molded article used in a part such as a joint where large deformation frequently occurs due to bend or curvature, the amount-of-work-holding rate is preferably 60% or more.

The medical molded article according to the present invention is, for use, placed inside or outside the living body. Therefore, it is assumed that the medical molded article repeatedly receives force due to the movement of a muscle or a joint to repeat deformation and recovery. Therefore, the present molded article needs to have durability against repeated deformation. The durability can be quantitatively evaluated by measuring the permanent strain generated in the measurement of the amount-of-work-holding rate. The medical molded article used near a muscle is frequently deformed. Therefore, the medical molded article according to embodiments of the present invention has a permanent strain of 20% or less, and in the case of the medical molded article used in a part such as a joint where large deformation frequently occurs due to bend or curvature, the permanent strain is preferably 15% or less.

In the molded article according to the present invention, the blending ratio of a bioabsorbable polyester is not limited as long as the molded article including the bioabsorbable polyester exhibits a bioabsorbable property for various usage to the extent as required. In general, the molded article preferably includes a bioabsorbable polyester at a content of 50% by weight or more, and more preferably 80% by weight or more. If the molded article needs to completely disappear when applied to a living body, the molded article preferably includes only a bioabsorbable polyester. Furthermore, the molded article preferably includes the bioabsorbable polyester described below to the extent as described above in order to exhibit the physical property required in the present invention, that is, in order to exhibit a low Young's modulus while maintaining the high tensile strength to achieve excellent followability to a living body.

Here, the bioabsorbable property is the property of a substance that is naturally decomposed after being placed inside or outside the living body by a hydrolysis reaction or an enzymatic reaction to generate a decomposed product that disappears by metabolism or excretion. Examples of the bioabsorbable polyester includes polyesters selected from the group consisting of polyglycolic acid, polylactic acid (D, L, and DL form), poly-ε-caprolactone, polyhydroxybutyrate, polyhydroxybutyrate valerate, polyorthoesters, polyhydroxyvalerate, polyhydroxyhexanoate, polyhydroxybutyrate, polybutylene succinate, polybutylene succinate, polytrimethylene terephthalate, polyhydroxyalkanoates, and copolymers of at least two selected from the group consisting of polyglycolic acid, polylactic acid, poly-ε-caprolactone, polyhydroxybutyrate, polyhydroxybutyrate valerate, polyorthoesters, polyhydroxyvalerate, polyhydroxyhexanoate, polyhydroxybutyrate, polybutylene succinate, polybutylene succinate, polytrimethylene terephthalate, and polyhydroxyalkanoates. The medical molded article according to the present invention more preferably includes, among the above-described polyesters, any of polyglycolic acid, a copolymer of polylactic acid and polyglycolic acid, and a copolymer of polyglycolic acid and poly-ε-caprolactone.

In a preferable aspect, the molded article according to the present invention includes, as the bioabsorbable polyester, a polyester copolymer including a monomer residue selected from hydroxycarboxylic acid residues and lactone residues as a main structural unit. In a more preferable aspect, the molded article includes a polyester copolymer including two kinds of monomer residues of a hydroxycarboxylic acid residue and a lactone residue as main structural units. A lactone is a cyclic compound in which the hydroxy group and the carboxyl group of a hydroxycarboxylic acid are intramolecularly dehydrated and condensed. Here, the phrase "including a certain monomer residue as a main structural unit" means that the certain monomer residue is 50% by mol or more of the residues including other monomer residues in the whole polymer. The phrase "including two kinds of monomer residues as main structural units" means that the total of the two kinds of monomer residues is 50% by mol or more of the residues including other monomer residues in the whole polymer, and each of the two kinds of monomer residues is 20% by mol or more of the residues in the whole polymer.

For example, the phrase "including a hydroxycarboxylic acid residue and a lactone residue as main structural units" means that the total of the hydroxycarboxylic acid residue and the lactone residue is 50% by mol or more of the residues in the whole polymer, the hydroxycarboxylic acid residue is 20% by mol or more of the residues in the whole polymer, and the lactone residue is 20% by mol or more of the residues in the whole polymer. The mole fraction of each monomer residue can be determined by nuclear magnetic resonance (NMR) measurement from the area value of the signal derived from each residue. For example, the mole fractions of a lactic acid residue as the hydroxycarboxylic acid residue and a caprolactone residue as the lactone residue can be measured by the method described in Measurement Example 2 described below.

The monomer for formation of the hydroxycarboxylic acid residue is particularly preferably an aliphatic hydroxycarboxylic acid. Examples of the aliphatic hydroxycarboxylic acid include lactic acid, glycolic acid, hydroxybutyric acid, hydroxyvaleric acid, hydroxypentanoic acid, hydroxycaproic acid, and hydroxyheptanoic acid, and lactic acid, glycolic acid, and hydroxycaproic acid are particularly preferable. As the lactic acid, $_L$-lactic acid, $_D$-lactic acid, and a mixture thereof can be used. From the viewpoint of the physical property and the biocompatibility of a polymer to be obtained, lactic acid is preferably used, and $_L$-lactic acid is particularly preferably used. In the case of using the mixture as the monomer, the $_L$-isomer is preferably included at a content of 85% or more, and more preferably 95% or more.

As the monomer for formation of the hydroxycarboxylic acid residue, lactide may be used. Lactide is a cyclic compound in which the hydroxy group of one hydroxycarboxylic acid molecule and the carboxyl group of another hydroxycarboxylic acid molecule are dehydrated and condensed, and the carboxyl group of the former molecule and the hydroxy group of the latter molecule are dehydrated and condensed. As the lactide, dilactide obtained by dehydration condensation of two lactic acid molecules, glycolide obtained by dehydration condensation of two glycolic acid molecules, and tetramethylglycolide can be used.

Examples of the monomer for formation of the lactone residue include ε-caprolactone, dioxepanone, ethylene oxalate, dioxanone, 1,4-dioxane-2,3-dione, β-propiolactone, δ-valerolactone, β-propiolactone, β-butyrolactone, γ-butyrolactone, and pivalolactone.

The derivatives of the monomers exemplified above can also be used.

In the present description, a "monomer residue" included in a polyester copolymer is, in principle, a repeating unit of a chemical structure derived from a monomer in the chemical structure of the polyester copolymer obtained from a polymerization stock solution containing the monomer. For example, in the case that lactic acid ($CH_3CH(OH)COOH$) and caprolactone (ε-caprolactone: represented by the following formula)

[Chem. 1]

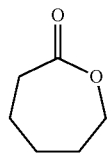

are polymerized to form a copolymer of lactic acid and caprolactone, the unit represented by the following formula

[Chem. 2]

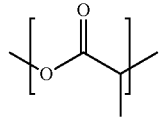

(R1)

is a lactic acid monomer residue, and the unit represented by the following formula is a caprolactone monomer residue.

[Chem. 3]

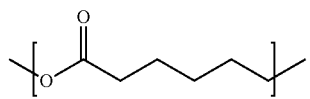

(R2)

As an exception, in the case of using a dimer such as lactide as the monomer, the term "monomer residue" means one structure that is repeated twice derived from the dimer. For example, in the case that dilactide ($_L$-(-)-lactide: represented by the following formula)

[Chem. 4]

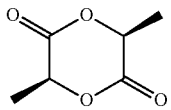

and caprolactone are polymerized, the copolymer has a chemical structure in which a dilactide residue having the structure represented by the formula (R1) that is repeated twice is formed. In this case, one lactic acid unit in the chemical structure is regarded as a "monomer residue", thus considering that two "monomer residues", that is, two lactic acid residues are formed derived from dilactide.

The bioabsorbable polyester used in the present invention preferably has a weight average molecular weight of 100,000 or more in order to obtain an effect of improving the tensile strength due to entanglement of the polymer chains. The upper limit of the weight average molecular weight is not particularly limited. From the viewpoint of the problem with the manufacturing method due to increase in the viscosity and the viewpoint of deterioration of the moldability, the upper limit is preferably 1,600,000 or less, more preferably 800,000 or less, and still more preferably 400,000 or less. The weight average molecular weight can be determined by a gel permeation chromatography (GPC) method, and is specifically determined by the method described in Measurement Example 1 described below.

Hereinafter, a polyester copolymer including a hydroxycarboxylic acid residue and a lactone residue as main structural units will be described as a particularly preferable bioabsorbable polyester in the present invention.

In the polyester copolymer, the total of a hydroxycarboxylic acid residue and a lactone residue is, from the above-described definition, 50% by mol or more, preferably 75% by mol or more, and more preferably 90% by mol or more of the residues including other monomer residues in the whole polymer. The hydroxycarboxylic acid residue and the lactone residue are, from the above-described definition, each 20% by mol or more, preferably 30% by mol or more, and more preferably 40% by mol or more. A particularly preferable aspect is, for example, a polymer in which the total number of a hydroxycarboxylic acid residue and a lactone residue is 100% of the number of residues in the whole polymer, that is, a polymer including only a hydroxycarboxylic acid residue and a lactone residue.

If a polymer includes one residue excessively, the property of the polymer becomes further similar to that of a homopolymer. Therefore, the molar ratio of the hydroxycarboxylic acid residue to the lactone residue is preferably 7/3 to 3/7, and more preferably 6/4 to 4/6.

Furthermore, another monomer capable of copolymerizing with a hydroxycarboxylic acid and a lactone can be further copolymerized, and copolymerization of a monomer that functions as a linker is a preferable aspect. Examples of the monomer that functions as a linker include hydroxycarboxylic acids other than the hydroxycarboxylic acid included in the main structural unit, dialcohols, dicarboxylic acids, amino acids, diamines, diisocyanates, and diepoxides.

In the present description, the term "polyester copolymer" also refers to copolymers having structural units including a unit of a monomer other than a hydroxycarboxylic acid and a lactone and thus partially including a structural unit connected by a bond other than an ester bond.

When a monomer forming the hydroxycarboxylic acid residue (referred to as "monomer A") and a monomer forming the lactone residue (referred to as "monomer B") in the polyester copolymer are copolymerized in equimolar amounts, the initial polymerization rate of the monomer A, $V_A$, and the initial polymerization rate of the monomer B, $V_B$, preferably satisfy the relationship $1.1 \leq V_A/V_B \leq 40$.

Here, $V_A$ and $V_B$ are determined by the following method. The monomer A and the monomer B are mixed in equimolar amounts, a solvent and a catalyst are added if necessary, the conditions such as temperature are adjusted so that the R value is the same as the R value, described below, of the finally synthesized polyester copolymer or a polyester copolymer to be synthesized with an error within the range of 10%, and a polymerization reaction is started. Sampling is periodically performed from the sample during the polymerization, and the remaining amounts of the monomer A and the monomer B are measured. The remaining amount is measured by, for example, chromatography or nuclear magnetic resonance (NMR) measurement. The remaining amount is subtracted from the charged amount to determine the amount of the monomer subjected to the polymerization reaction. The amount of the monomer subjected to the polymerization reaction is plotted against the sampling time to obtain a curve. $V_A$ and $V_B$ are the initial gradients of the curves obtained as described above.

When the monomer A and the monomer B as described above are reacted, there is a high probability, in the initial stage of polymerization, that the monomer A is bonded to the polymer terminal during the polymerization. In the latter stage of polymerization in which the concentration of the monomer A in the reaction solution is reduced due to the consumption of the monomer A, the probability is increased that the monomer B is bonded to the polymer terminal during the polymerization. As a result, a gradient polymer is obtained in which the ratio of the monomer A residue gradually decreases from one terminal. In such a gradient polymer, the crystallinity is low, and increase in the Young's modulus is suppressed. For facilitation of the gradient structure formation, $V_A/V_B$ is more preferably 1.3 or more, and still more preferably 1.5 or more. If the difference in the polymerization rate between the monomer A and the monomer B is too large, the structure becomes similar to that of a block polymer in which the polymer B is polymerized after only the monomer A is polymerized, and in some cases, the crystallinity is increased to cause increase in the Young's modulus. Therefore, $V_A/V_B$ is more preferably 30 or less, still more preferably 20 or less, and still even more preferably 10 or less.

Examples of the preferable combination of the monomer A and the monomer B as described above include dilactide and ε-caprolactone, glycolide and ε-caprolactone, dilactide and dioxepanone, dilactide and δ-valerolactone, and glycolide and δ-valerolactone.

The polyester copolymer preferably has an R value represented by the following formula of 0.45 or more and 0.99 or less. The mole fraction in the polyester copolymer is a percentage to 100% of the whole monomer residues included in the polyester copolymer.

$$R \text{ value} = [AB]/(2[A][B]) \times 100$$

[A] represents a mole fraction (%) of the hydroxycarboxylic acid residue in the polyester copolymer.

[B] represents a mole fraction (%) of the lactone residue in the polyester copolymer.

[AB] represents a mole fraction (%) of a structure in which the hydroxycarboxylic acid residue and the lactone residue are adjacent to each other in the polyester copolymer.

The R value is used as an index indicating the randomness of the sequence of the monomer residues in the copolymer having two kinds of monomer residues, that is, the hydroxycarboxylic acid residue and the lactone residue as main structural units. For example, the R value is 1 in the case of a random copolymer having a completely random monomer sequence. The R value of a block copolymer is 0 to 0.44.

The R value can be determined by quantifying the ratio of the combinations of two adjacent monomers (A-A, B-B, A-B, B-A) by nuclear magnetic resonance (NMR) measurement, and is specifically measured by the method described in Measurement Example 2 described below. If the R value is less than 0.45, the crystallinity is high, the molded article of the copolymer becomes hard, and the Young's modulus is increased. If the R value is more than 0.99, the copolymer molded article becomes so soft as to exhibit adhesiveness, leading to deterioration of the handleability. From the same viewpoint, the polyester copolymer used in the present invention preferably has an R value of 0.50 or more, and preferably 0.80 or less.

It is known that the crystallinity of a polymer has a great influence on the mechanical strength of the molded article. In general, a polymer having low crystallinity exhibits low Young's modulus. Therefore, low crystallinity is desirable for flexibility. The crystallization rate of a polymer is determined from the heat of fusion by differential scanning calorimetry (DSC) measurement.

In the polyester copolymer, at least one of the hydroxycarboxylic acid residue or the lactone residue preferably has a crystallization rate of less than 14%. If the crystallization rate is less than 14%, increase in the Young's modulus is suppressed, and a polyester copolymer suitable for a medical molded article can be obtained. The hydroxycarboxylic acid residue and/or the lactone residue more preferably has a crystallization rate of 10% or less, and still more preferably 5% or less.

Here, the term "crystallization rate of a monomer residue" refers to the ratio of the heat of fusion per unit weight of the monomer residue in the polyester copolymer to the product of the heat of fusion per unit weight of a homopolymer including only the monomer residue and the weight fraction of the monomer residue in the polyester copolymer. That is, the crystallization rate of the hydroxycarboxylic acid residue is the ratio of the heat of fusion per unit weight of the hydroxycarboxylic acid residue in the polyester copolymer to the product of the heat of fusion per unit weight of a homopolymer including only the hydroxycarboxylic acid and the weight fraction of the hydroxycarboxylic acid residue in the polyester copolymer. The crystallization rates of the hydroxycarboxylic acid residue and the lactone residue each show the rate of the hydroxycarboxylic acid residue or the lactone residue forming a crystal structure in the polyester copolymer. The crystallization rate is specifically to be determined by the method described in Measurement Example 4 described below.

The above-described polyester copolymer can be manufactured by, for example, a synthesis method including:

a macromer synthesis step of blending and polymerizing a monomer A forming a hydroxycarboxylic acid residue and a monomer B forming a lactone residue so that the total of the hydroxycarboxylic acid residue and the lactone residue is 50% by mol or more of all the residues, and the hydroxycarboxylic acid residue and the lactone residue are each 20% by mol or more of all the residues at the completion of polymerization; and a multimerization step of performing multimerization by connecting the macromers obtained in the macromer synthesis step, or by additionally adding the hydroxycarboxylic acid and the lactone to the macromer solution obtained in the macromer synthesis step.

In the macromer synthesis step, a monomer A forming a hydroxycarboxylic acid residue and a monomer B forming a lactone residue are blended and polymerized so that the total of the hydroxycarboxylic acid residue and the lactone residue is 50% by mol or more of all the residues, and the hydroxycarboxylic acid residue and the lactone residue are each 20% by mol or more of all the residues at the completion of polymerization theoretically. As a result, a polyester copolymer including the hydroxycarboxylic acid residue and the lactone residue as main structural units is obtained. However, in this manufacturing method, since the multimerization step described below is further performed, the polyester copolymer obtained by this step is expressed as "macromer" in the present description.

The randomness of the distribution of the hydroxycarboxylic acid residue and the lactone residue depends on the reactivity of the monomers during polymerization. That is, if the probability that one of the two kinds of monomers is bonded to the same kind of monomer is the same as the probability that the monomer is bonded to the different kind of monomer during polymerization, a random copolymer in which the monomer residues are distributed completely at random can be obtained. However, if one of the monomers tends to be bonded to any one kind of monomer more easily than to the other kind of monomer, a gradient copolymer having a biased distribution of the monomer residues is obtained. In the obtained gradient copolymer, the composition of the monomer residues continuously changes from the polymerization start terminal to the polymerization end terminal along the molecular chain.

Here, a hydroxycarboxylic acid is generally a monomer having a higher initial polymerization rate than a lactone. Therefore, when a hydroxycarboxylic acid and a lactone are copolymerized in the macromer synthesis step, the hydroxycarboxylic acid is likely to be bonded to a hydroxycarboxylic acid. Therefore, in the synthesized macromer, a gradient structure is formed in which the ratio of the hydroxycarboxylic acid unit gradually decreases from the polymerization start terminal to the polymerization end terminal. That is, the macromer obtained in this step has a gradient structure having a composition gradient of the hydroxycarboxylic acid residue and the lactone residue in the skeleton due to the difference in the initial polymerization rate between the hydroxycarboxylic acid and the lactone. Such a macromer is sometimes referred to as a "gradient macromer" in the present description.

For achievement of such a gradient structure in the macromer synthesis step, it is desirable to synthesize a macromer by a polymerization reaction that proceeds in one direction from the start terminal. As such a synthesis reaction, for example, ring-opening polymerization and living polymerization are preferably used.

For facilitation of manufacture of a polyester copolymer finally satisfying the R value shown in (1) above, the macromer obtained in this step preferably has an R value similar to that of the polyester copolymer described in (1) above. That is, the R value is represented by the following formula:

$$R \text{ value}=[AB]/(2[A][B])\times 100$$

wherein [A] represents a mole fraction (%) of the hydroxycarboxylic acid residue in the macromer,

[B] represents a mole fraction (%) of the lactone residue in the macromer, and

[AB] represents a mole fraction (%) of a structure in which the hydroxycarboxylic acid residue and the lactone residue are adjacent to each other (A-B and B-A) in the macromer, and the R value is preferably 0.45 or more and 0.99 or less, and more preferably 0.50 or more and 0.80 or less.

Similarly, the macromer obtained in this step preferably includes a monomer residue having a crystallization rate described in (2) above, that is, at least one of the hydroxycarboxylic acid residue or the lactone residue preferably has a crystallization rate of less than 14%, more preferably 10% or less, still more preferably 5% or less, and most preferably 1% or less for facilitation of manufacture of a polyester copolymer in which the hydroxycarboxylic acid residue or the lactone residue finally has a crystallization rate shown in (2) above.

The macromer synthesized in the macromer synthesis step preferably has a weight average molecular weight of 10,000 or more, and more preferably 20,000 or more. For the purpose of suppressing the crystallinity to maintain the flexibility, the weight average molecular weight is preferably 150,000 or less, and more preferably 100,000 or less.

In the multimerization step, multimerization is performed by connecting the macromers obtained in the macromer synthesis step, or by additionally adding the hydroxycarboxylic acid and the lactone to the macromer solution obtained in the macromer synthesis step. In this step, the macromers obtained in one macromer synthesis step may be connected to each other, or a plurality of macromers obtained in two or more macromer synthesis steps may be connected. The term "multimerization" means forming, by any of these methods, a structure in which a plurality of molecular chains are repeated that have a gradient structure having a composition gradient of the hydroxycarboxylic acid residue and the lactone residue in the skeleton.

The number of macromer units to be subjected to multimerization is to be 2 or more, and preferably 3 or more, more preferably 4 or more, and still more preferably 6 or more because a large number of connections generate the effect of improving the tensile strength due to entanglement of the molecular chains. If, as a result, the molecular weight of the polyester copolymer is excessively increased, there is a concern that increase in the viscosity may adversely affect the moldability. Therefore, the number of macromer units is preferably 80 or less, more preferably 40 or less, and still more preferably 20 or less.

The number of connections of macromer units can be adjusted according to the catalyst used in the multimerization process and the reaction time. In multimerization by connecting macromers to each other, the number of macromer units can be determined by dividing the weight average molecular weight of the finally obtained polyester copolymer by the weight average molecular weight of the macromers.

The polyester copolymer may be a linear polymer in which macromer units are linearly connected, or may be a branched polymer in which macromer units are connected in a branched form.

The linear polyester copolymer can be synthesized by, for example, bonding the terminal of one gradient macromer molecule to each terminal of the same kind of gradient macromer via the terminals.

In the case of a gradient macromer having a hydroxyl group and a carboxyl group at both terminals respectively, the terminals are condensed with a condensing agent to obtain a multimerized polyester copolymer. As the condensing agent, 4,4-dimethylaminopyridinium p-toluenesulfonate, 1-[3-(dimethylamino)propyl]-3-ethylcarbodiimide, 1-ethyl-3-(3-dimethylaminopropyl)carbodiimide hydrochloride, N,N'-dicyclohexylcarbodiimide, N,N'-diisopropylcarbodiimide, N,N'-carbonyldiimidazole, 1,1'-carbonyldi(1,2,4-triazole), 4-(4,6-dimethoxy-1,3,5-triazin-2-yl)-4-methylmorpholinium=chloride n hydrate, (4,6-dimethoxy-1,3,5-triazin-2-yl)-(2-octoxy-2-oxoethyl) dimethylammonium trifluoromethanesulfonate, 1H-benzotriazol-1-yloxytris(dimethylamino)phosphonium hexafluorophosphate, 1H-benzotriazol-1-yloxytripyrrolidinophosphonium hexafluorophosphate, (7-azabenzotriazol-1-yloxy) tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4 (3H)-one, O-(benzotriazol-1-yl)-N,N,N',N'-tetramethyluronium hexafluorophosphate, O-(7-azabenzotriazol-1-yl)-N, N,N',N'-tetramethyluronium hexafluorophosphate, O-(N-succinimidyl)-N,N,N',N'-tetramethyluronium tetrafluoroborate, O-(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, S-(1-oxide-2-pyridyl)-N,N,N',N'-tetramethylthiuronium tetrafluoroborate, O-[2-oxo-1(2H)-pyridyl]-N,N,N',N'-tetramethyluronium tetrafluoroborate, {{[(1-cyano-2-ethoxy-2-oxoethylidene)amino]oxy}-4-morpholinomethylene}dimethylammonium hexafluorophosphate, 2-chloro-1,3-dimethylimidazolinium hexafluorophosphate, 1-(chloro-1-pyrrolidinylmethylene) pyrrolidinium hexafluorophosphate, 2-fluoro-1,3-dimethylimidazolinium hexafluorophosphate, fluoro-N,N, N',N'-tetramethylformamidinium hexafluorophosphate, and the like can be used.

In the case of a living polymerization reaction, that is, in the case that a polymerization reaction can be started from the terminal of a polymer continuously, multimerization can be achieved by repeating an operation of additionally adding a hydroxycarboxylic acid and a lactone to a gradient macromer solution after the polymerization reaction is completed.

Alternatively, the gradient macromers may be multimerized via a linker as long as a dynamical property of the polymer is not affected. In particular, by using a linker having a plurality of carboxyl groups and/or a plurality of hydroxy groups, such as 2,2-bis(hydroxymethyl)propionic acid, a branched polyester copolymer having the linker as a branch point can be synthesized.

The polyester copolymer obtained by the above-described manufacturing method has a structure including two or more connected macromer units having a composition gradient of the hydroxycarboxylic acid residue and the lactone residue in the skeleton. In the present description, such a structure is sometimes referred to as "multi-gradient" for convenience, and a copolymer having a multi-gradient structure is sometimes referred to as "multi-gradient copolymer". The multi-gradient copolymer preferably has a structure including two or more, and preferably three or more connected macromer units having a gradient structure having a composition gradient of the hydroxycarboxylic acid residue and the lactone residue in the skeleton.

As described above, a polyester copolymer in which the hydroxycarboxylic acid residue is a lactic acid residue and the lactone residue is a caprolactone residue or a valerolactone residue is a particularly preferable aspect for application to a medical molded article. Such a polyester copolymer is preferably manufactured by the following manufacturing method.

First, in the macromer synthesis step, dilactide and ε-caprolactone (or valerolactone, the same applies below) are polymerized in the presence of a catalyst. The dilactide and the ε-caprolactone monomer are preferably purified to remove impurities prior to use. Dilactide can be purified by, for example, recrystallization from toluene dried with sodium. ε-Caprolactone is purified by, for example, distillation under reduced pressure from $CaH_2$ in an $N_2$ atmosphere.

Dilactide and ε-caprolactone differ greatly in reactivity as described in the literature (D. W. Grijpmaetal. PolymerBulletin 25, 335, 341), and a dilactide monomer has a higher initial polymerization rate than ε-caprolactone. The initial polymerization rate of dilactide, $V_A$, is 3.6%/h in terms of reaction rate (%), the initial polymerization rate of ε-caprolactone, $V_B$, is 0.88%/h and the value of $V_A/V_B$ is 4.1. Therefore, the macromer obtained by copolymerizing dilactide and ε-caprolactone is a gradient macromer.

As a catalyst having a lactic acid residue and a caprolactone residue in the macromer synthesis step, a normal polyester polymerization catalyst such as a germanium-based, titanium-based, antimony-based, or tin-based catalyst can be used. Specific examples of such a polyester polymerization catalyst include tin octylate, antimony trifluoride, zinc powder, dibutyltin oxide, and tin oxalate. The method of adding the catalyst to a reaction system is not particularly limited, and is preferably a method in which the catalyst is added in a state of being dispersed in a raw material when the raw material is charged or in a state of being dispersed at the start of pressure reduction. The amount of the catalyst used is 0.01 to 3% by weight, and more preferably 0.05 to 1.5% by weight in terms of the metal atom, based on the total amount of the monomers used.

A macromer having a lactic acid residue and a caprolactone residue can be obtained by charging dilactide, caprolactone, and a catalyst into a reaction vessel equipped with a stirrer and reacting the resulting mixture at 150 to 250° C. under a nitrogen stream. In the case of using water as a co-initiator, a cocatalyst reaction is preferably performed at around 90° C. prior to the polymerization reaction. The reaction time is 2 hours or more, preferably 4 hours or more, and more preferably a longer time, for example, 8 hours or more for increase in the degree of polymerization. However, because too long a reaction time may cause a coloring problem of the polymer, the reaction time is preferably 3 to 12 hours.

Next, in the multimerization step, the terminals of the gradient macromers having a lactic acid residue and a caprolactone residue are connected to each other by a condensation reaction for multimerization. The reaction temperature of the condensation reaction is preferably 10 to 100° C., and more preferably 20 to 50° C. The reaction time is preferably 1 day or longer, and more preferably 2 days or longer. However, because too long a reaction time may cause a coloring problem of the polymer, the reaction time is preferably 2 to 4 days.

Such a polyester is molded into a specific form by a melt molding method or a solvent molding method to produce a molded article having a bioabsorbable property, a Young's modulus of 10 MPa or less, and a tensile strength of 5 MPa or more. The melt molding method is a method in which a polymer is melted by heating and molded using a mold, an extrusion molding machine, a press machine, or the like to mold a medical molded article having a form such as a fiber, film, or tube form. For example, the copolymer according to embodiments of the present invention is heated to 200° C. in an extrusion molding machine equipped with a φ1 mm spinneret and extruded to mold a polymer having a fiber form. The solvent molding method is a method in which a polymer is dissolved in a solvent, the resulting solution is injected into a mold or a coagulation bath, and the solvent and the solute are separated for molding. By this method, a medical molded article having a form such as a fiber or film form can be molded. Examples of the solvent molding method include a method in which a rod having a diameter of φ0.5 to 4 mm is immersed in a solution of a polymer dissolved in chloroform at a content of 20%, then pulled up, and after volatilization of the solvent, immersed again, the above described sequential steps are repeated about 5 to 10 times, and finally, the rod as a core is pulled out to mold an article having a tube form. The molded article molded into a tube form is attached to both ends of a cut nerve and thus can be used as a nerve guidance conduit that protects nerve regeneration.

EXAMPLES

Hereinafter, the present invention will be specifically described with reference to examples, but the present invention should not be construed as being limited to those examples, and all technical ideas that are conceived by those skilled in the art who contacted the concepts of the present invention and considered as implementable, and specific modes thereof should be understood as being included in the present invention.

[Measurement Example 1: Measurement of Weight Average Molecular Weight by Gel Permeation Chromatography (GPC)]

Device name: Prominence (manufactured by SHIMADZU CORPORATION)

Mobile phase: chloroform (for HPLC) (manufactured by Wako Pure Chemical Industries, Ltd.)

Flow rate: 1 mL/min

Column: TSKgel GMHHR-M (φ7.8 mm×300 mm; manufactured by Tosoh Corporation)

Detector: UV (254 nm), RI

Temperature of column and detector: 35° C.

Reference material: polystyrene

The purified polymer was dissolved in chloroform, the resulting solution was passed through a 0.45 μm syringe filter (DISMIC-13HP; manufactured by ADVANTEC) to remove impurities and the like, then the resulting product was measured by GPC, and the weight average molecular weight of the copolymer was calculated. Table 1 shows the result.

[Measurement Example 2: Measurement of Mole Fraction and R Value of Each Residue by Nuclear Magnetic Resonance (NMR)]

The purified copolymer was dissolved in deuterated chloroform, the resulting solution was measured by $^1$H-NMR, and the ratio of each of the lactic acid monomer residue and the caprolactone monomer residue in the copolymer was calculated. Furthermore, using $^1$H homospin decoupling method, with respect to a methylene group (around 5.10 ppm) of the lactic acid and an α-methylene group (around 2.35 ppm) and an ε-methylene group (around 4.10 ppm) of the caprolactone, adjacent monomer residues were separated by a signal derived from the lactic acid or the caprolactone, and each peak area was quantified. [A], [B], and [AB] were calculated from each peak area ratio, and the R value was calculated.

Device name: JNM-EX270 (manufactured by JEOL Ltd.)
$^1$H homospin decoupling irradiation position: 1.66 ppm
Solvent: deuterated chloroform
Measurement temperature: room temperature

[Measurement Example 3: Tensile Test]

The film (thickness: about 0.1 mm) produced in each of Examples and Comparative Examples was cut out to 50 mm×5 mm, and the resulting sample was subjected to a tensile test using a Tensilon universal testing machine RTM-100 (manufactured by ORIENTEC CORPORATION) in accordance with JIS K6251 (2010) under the following conditions, and the rupture elongation and the tensile strength were calculated. Furthermore, in the graph obtained by plotting the stress against the displacement, the Young's modulus was determined by calculating the slope of the linear equation obtained by approximation from the 5 points data from the start of stress generation.

Device name: Tensilon universal tensile tester RTM-100 (manufactured by ORIENTEC CORPORATION)
Initial length: 10 mm
Tension rate: 500 mm/min
Load cell: 50 N
Number of tests: 5

[Measurement Example 4: Measurement of Crystallization Rate of Lactic Acid Residue by Differential Scanning Calorimetry (DSC)]

The purified polymer was dried under reduced pressure and dissolved in chloroform to a concentration of 5% by weight, and the resulting solution was transferred onto a "Teflon" (registered trademark) petri dish, and dried for one day and night under normal pressure at room temperature. The resulting product was dried under reduced pressure to obtain a copolymer film. The obtained copolymer film was sampled on an alumina pan, measured by a DSC method with a differential scanning calorimeter under the following conditions, and the heat of fusion was calculated from the measurement results under the temperature conditions (D) to (E). The crystallization rate was calculated from the following formula. Table 1 shows the result.

Crystallization rate=(heat of fusion per unit weight of lactic acid residue of polyester copolymer)/{(heat of fusion per unit weight of homopolymer including only lactic acid residue)×(weight fraction of lactic acid residue in polyester copolymer)}×100

Device name: EXSTAR 6000 (manufactured by Seiko Instruments Inc.)
Temperature conditions: (A) 25° C.→(B) 250° C. (10° C./min)→(C) 250° C. (5 min)→(D) −70° C. (10° C./min)→(E) 250° C. (10° C./min)→(F) 250° C. (5 min)→(G) 25° C. (100° C./min)
Reference Material: Alumina

[Measurement Example 5: Measurement of Amount-of-Work-Holding Rate and Permanent Strain]

The film (thickness: about 0.1 mm) produced in each of Examples and Comparative Examples was cut out into a strip (50 mm×5 mm). While the strip of the film was stretched and restored 10 times using a Tensilon universal testing machine RTM-100 (manufactured by ORIENTEC CORPORATION) under the following conditions, the changes in the tensile stress and the displacement were recorded. In the case of a molded article that has a form other than a film form, the molded article is dissolved in a solvent that can dissolve the molded article, such as chloroform, and then molded into a film having a size as described above, and then measurement is performed.

Figure 2:
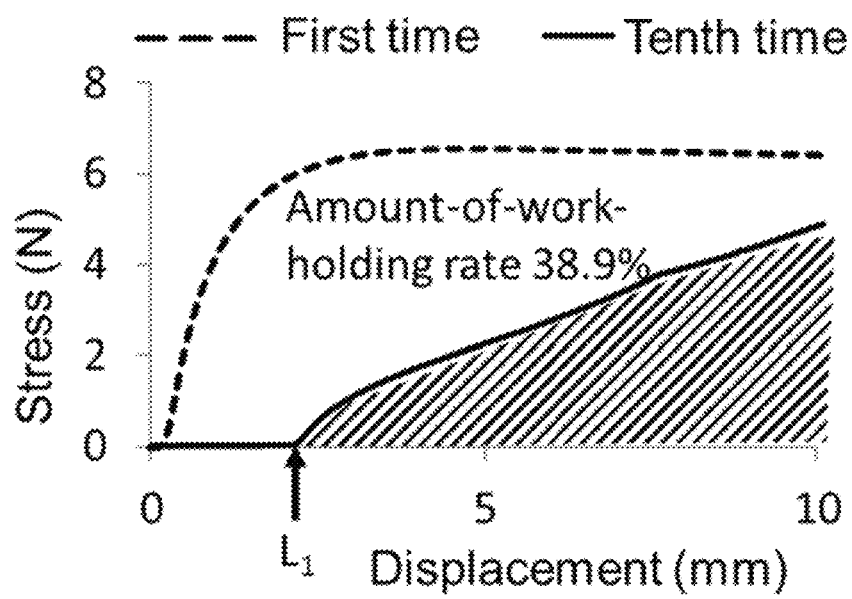
FIG. 2 is a graph showing the amount-of-work-holding rate by plotting stress against displacement in the tensile test in Comparative Example 2.
Figure 3:
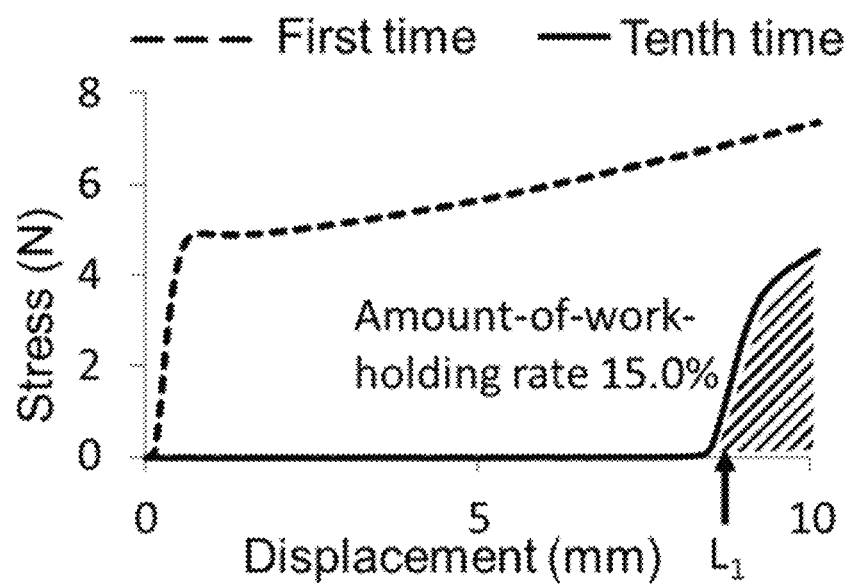
FIG. 3 is a graph showing the amount-of-work-holding rate by plotting stress against displacement in the tensile test in Comparative Example 4.
Figure 4:
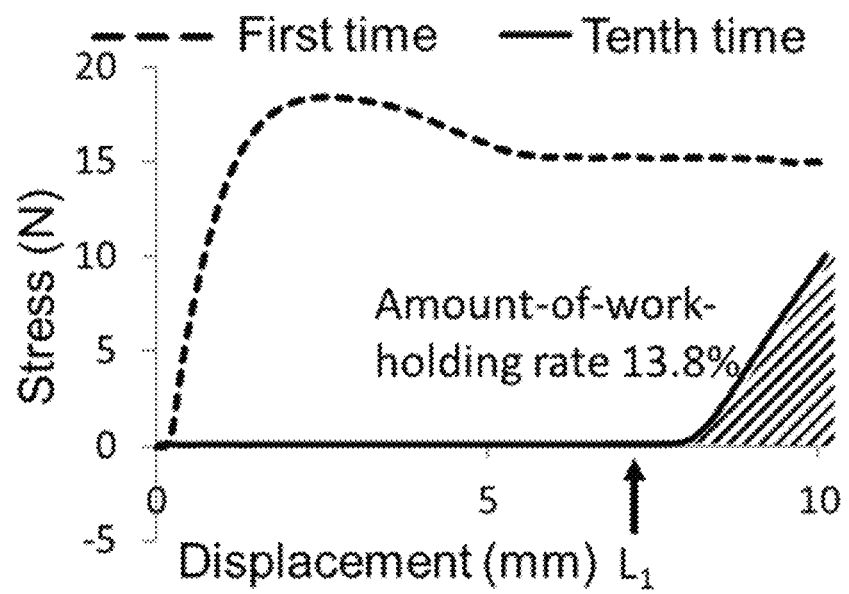
FIG. 4 is a graph showing the amount-of-work-holding rate by plotting stress against displacement in the tensile test in Comparative Example 5.
Figure 5:
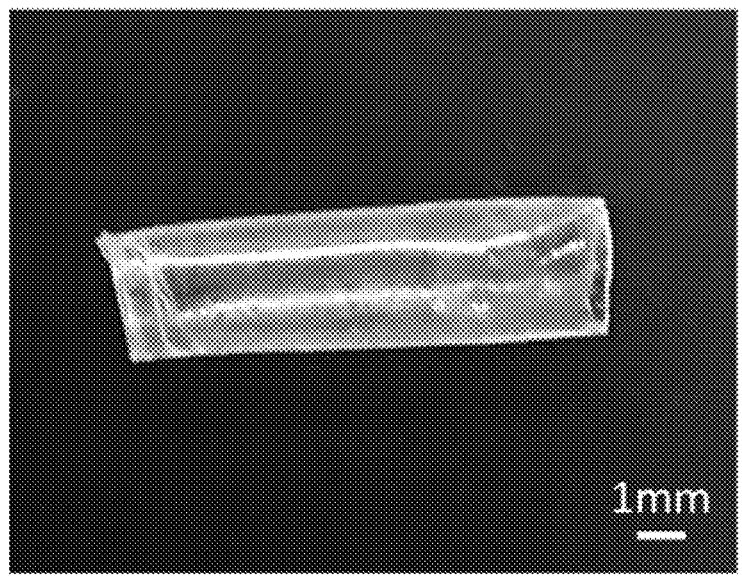
FIG. 5 is a photograph of the medical tube produced in Example 1.

Device name: Tensilon universal tensile tester RTM-100 (manufactured by ORIENTEC CORPORATION)
Initial length ($L_0$): 10 mm
Tension length (L): 10 mm
Since the initial length ($L_0$) and the tension length (L) are the same, a tensile strain of 100% is generated.
Retention time: 1 s
Tension rate: 500 mm/min
Restoring rate: 500 mm/min
Load cell: 50 N When stresses to displacements of ($X_1, X_2, \ldots$) are ($N_1, N_2, \ldots$) respectively, the amount of work (W) that causes a tensile strain of 100% corresponds to the area of the part below the displacement-stress curve shown in FIGS. 1 to 4, and calculated by the following formula:

$$W=\Sigma N_n(X_n-X_{n-1}), \text{ wherein } X_0=0.$$

When W is $W_1$ in the first time and $W_{10}$ in the tenth time, the amount-of-work-holding rate is $W_{10}/W_1 \times 100$. In FIGS. 1 to 4, the displacement-stress curve in the first time is shown by a dotted line, the stress curve in the tenth time is shown by a solid line, and the area of the shaded part shows the amount of work held.

After measuring the amount-of-work-holding rate, the sample is stretched again at the same tension rate, the changes in the tensile stress and the displacement are recorded, and the amount of displacement at which the stress is generated is defined as $L_1$. In FIGS. 1 to 4, $L_1$ is the amount of displacement at the position where the displacement-stress curve in the tenth time rises from the X-axis. The permanent strain can be calculated by the following formula.

$$\text{Permanent strain }(\%)=L_1/L_0\times100$$

Example 1

As monomers, 50.0 g of $_L$-lactide (PURASORB L; manufactured by PURAC) and 38.5 mL of ε-caprolactone (manufactured by Wako Pure Chemical Industries, Ltd.) were put in a separable flask. Under an argon atmosphere, 0.81 g of tin (II) octylate (manufactured by Wako Pure Chemical Industries, Ltd.) as a catalyst dissolved in 14.5 mL of toluene (super dehydrated) (manufactured by Wako Pure Chemical Industries, Ltd.), and ion-exchanged water as a co-initiator were added so that the monomer/co-initiator ratio was 142.9, and a cocatalyst reaction was carried out at 90° C. for 1 hour, followed by a copolymerization reaction at 150° C. for 6 hours to obtain a crude copolymer.

The obtained crude copolymer was dissolved in 100 mL of chloroform, and the resulting solution was added dropwise to 1,400 mL of methanol being stirred to obtain a precipitate. This operation was repeated 3 times, and the precipitate was dried under reduced pressure at 70° C. to obtain a macromer.

Together with 7.5 g of the macromer, 0.28 g of 4,4-dimethylaminopyridinium p-toluenesulfonate (synthetic product) as a catalyst and 0.10 g of 4,4-dimethylaminopyridine (manufactured by Wako Pure Chemical Industries, Ltd.) were collected. Under an argon atmosphere, the resulting mixture was dissolved in dichloromethane (dehydrated) (manufactured by Wako Pure Chemical Industries, Ltd.) to a concentration of 30%, 0.47 g of amylene (manufactured by Tokyo Chemical Industry Co., Ltd.) as a condensing agent dissolved in 5 mL of dichloromethane was added, and condensation polymerization was carried out at room temperature for 2 days.

To the reaction mixture, 30 mL of chloroform was added, and the resulting mixture was added dropwise to 500 mL of methanol being stirred to obtain a precipitate. The precipitate was dissolved in 50 mL of chloroform, and the resulting solution was added dropwise to 500 mL of methanol being stirred to obtain a precipitate. This operation was repeated twice to obtain a purified polyester copolymer as a precipitate.

The purified polyester copolymer was dried under reduced pressure and dissolved in chloroform to a concentration of 5% by weight, and a part of the resulting solution was transferred onto a "Teflon" (registered trademark) petri dish, and dried for one day and night under normal pressure at room temperature. The resulting product was dried under reduced pressure to obtain a film having a thickness of about 0.1 mm.

Furthermore, the purified polyester copolymer was dried under reduced pressure and dissolved in chloroform to a concentration of 20% by weight. A 10% by weight aqueous solution of polyvinyl alcohol (PVA) (manufactured by Sigma-Aldrich Co. LLC.) was prepared, and a metal rod having a diameter of φ4 mm was immersed to coat the surface with PVA. The tip of the PVA-coated metal rod was immersed in the purified polyester copolymer solution, then taken out, and allowed to stand for drying in a draft for 10 minutes. Then, immersion in the copolymer solution and drying were repeated 5 times, and finally, the metal rod was allowed to stand in a draft overnight. After the polymer was dried, the metal rod was immersed in a water bath set at 40° C. for 5 minutes, and then pulled out to obtain a molded article molded into a tube form (φ4 mm×10 mm). The tube can be used as a medical tube that can be used as a nerve guidance conduit.

Example 2

A film and a medical tube were produced in the same manner as in Example 1, except that in the synthesis of the polyester copolymer, the amount of the macromonomer used was changed to 40 g, and the blade used for stirring was changed to a "Teflon" (registered trademark) blade.

Example 3

A film and a medical tube were produced in the same manner as in Example 2, except that in the synthesis of the polyester copolymer, acetic acid was added to a content of 15 mM to 500 mL of methanol being stirred during purification of the reaction mixture of the macromonomer.

Example 4

A film and a medical tube were produced in the same manner as in Example 2, except that in the synthesis of the polyester copolymer, the amount of the macromonomer used was changed to 30 g.

Example 5

A film and a medical tube were produced in the same manner as in Example 3, except that in the synthesis of the polyester copolymer, the 500 mL of methanol being stirred was changed to 500 mL of hexane during purification of the reaction mixture of the macromonomer.

Example 6

A film and a medical tube were produced in the same manner as in Example 2, except that in the synthesis of the polyester copolymer, 100 mL of 1 N hydrochloric acid was mixed before the adding dropwise to the 500 mL of methanol being stirred during purification of the reaction mixture of the macromonomer.

Comparative Example 1

As monomers, 50.0 g of $_L$-lactide (PURASORB L; manufactured by PURAC) and 38.5 mL of ε-caprolactone (manufactured by Wako Pure Chemical Industries, Ltd.) were put in a separable flask. Under an argon atmosphere, 0.81 g of tin (II) octylate (manufactured by Wako Pure Chemical Industries, Ltd.) as a catalyst dissolved in 14.5 mL of toluene (super dehydrated) (manufactured by Wako Pure Chemical Industries, Ltd.) was added, and a copolymerization reaction was carried out at 150° C. for 6 hours to obtain a crude copolymer.

The obtained crude copolymer was dissolved in 100 mL of chloroform, and the resulting solution was added dropwise to 1,400 mL of methanol being stirred to obtain a precipitate. This operation was repeated 3 times to obtain a gradient copolymer as a precipitate. The gradient copolymer was dried under reduced pressure at 70° C., and then a film and a medical tube were produced in the same manner as in Example 1.

Comparative Example 2

As a monomer, 50.0 g of $_L$-lactide (PURASORB L; manufactured by PURAC) was put in a separable flask. Under an argon atmosphere, 0.81 g of tin (II) octylate (manufactured by Wako Pure Chemical Industries, Ltd.) as a catalyst dissolved in 14.5 mL of toluene (super dehydrated) (manufactured by Wako Pure Chemical Industries, Ltd.), and ion-exchanged water as a co-initiator were added so that the monomer/co-initiator ratio was 142.9, and a cocatalyst reaction was carried out at 90° C. for 1 hour, followed by a copolymerization reaction at 150° C. for 3 hours.

To the resulting product, 38.5 mL of ε-caprolactone (manufactured by Wako Pure Chemical Industries, Ltd.) was added, and a polymerization reaction was further carried out at a temperature of 150° C. described for 6 hours to obtain a crude copolymer.

The obtained crude copolymer was dissolved in 100 mL of chloroform, and the resulting solution was added dropwise to 1,400 mL of methanol being stirred to obtain a precipitate. This operation was repeated 3 times, and the precipitate was dried under reduced pressure at 70° C. to obtain a purified copolymer.

Together with 7.5 g of the purified copolymer, 0.28 g of 4,4-dimethylaminopyridinium p-toluenesulfonate (synthetic product) as a catalyst and 0.10 g of 4,4-dimethylaminopyridine (manufactured by Wako Pure Chemical Industries, Ltd.) were collected. Under an argon atmosphere, the resulting mixture was dissolved in dichloromethane (dehydrated) (manufactured by Wako Pure Chemical Industries, Ltd.) to a concentration of 5%, 1.38 g of dicyclohexylcarbodiimide (manufactured by Sigma-Aldrich Co. LLC.) as a condensing agent dissolved in 5 mL of dichloromethane was added, and condensation polymerization was carried out at room temperature for 2 days.

To the reaction mixture, 30 mL of chloroform was added, and the resulting mixture was added dropwise to 500 mL of methanol being stirred to obtain a precipitate. The precipitate was dissolved in 50 mL of chloroform, and the resulting solution was added dropwise to 500 mL of methanol being stirred to obtain a precipitate. This operation was repeated 2 times to obtain a precipitate, that is, a purified copolymer. The purified copolymer was dried under reduced pressure at 70° C., and then a film and a medical tube were produced in the same manner as in Example 1.

Comparative Example 3

A film and a medical tube were produced in the same manner as in Comparative Example 2, except that the concentration in the dichloromethane solution was 27%.

Comparative Example 4

PDLLA (manufactured by BMG Incorporated), which is polylactic acid, was purchased, and a film and a medical tube were produced in the same manner as in Example 1.

Comparative Example 5

Polycaprolactone (900288, manufactured by Sigma-Aldrich Co. LLC.), which is polycaprolactone, was purchased, and a film and a medical tube were produced in the same manner as in Example 1.

Tables 1 and 2 show the structures and various evaluation results of each molded article produced in each of Examples and Comparative Examples.

TABLE 1

| | Polymer structure | [A] Mole fraction of lactic acid residue (% by mol) | [B] Mole fraction of caprolactone residue (% by mol) | Mole fraction of [AB] (% by mol) | R value | Crystallization rate of lactic acid residue (%) | Weight average molecular weight | Number of macromer units |
|---|---|---|---|---|---|---|---|---|
| Example 1 | Multi-gradient | 49 | 51 | 47 | 0.94 | 0.00 | 79,464 | 2.6 |
| Example 2 | Multi-gradient | 50 | 50 | 33 | 0.67 | 0.00 | 165,578 | 3.6 |
| Example 3 | Multi-gradient | 50 | 51 | 34 | 0.68 | 0.00 | 248,791 | 5.3 |
| Example 4 | Multi-gradient | 49 | 51 | 25 | 0.50 | 0.00 | 379,725 | 10.2 |
| Example 5 | Multi-gradient | 55 | 45 | 30 | 0.60 | 0.00 | 240,000 | 5.4 |
| Example 6 | Multi-gradient | 54 | 46 | 31 | 0.62 | 0.00 | 230,000 | 5.2 |
| Comparative Example 1 | Gradient | 50 | 50 | 23 | 0.47 | 16.2 | 41,618 | — |
| Comparative Example 2 | Multi-block | 52 | 48 | 16 | 0.33 | 14.0 | 138,443 | 7.3 |
| Comparative Example 3 | Multi-block | 51 | 49 | 15 | 0.30 | 42.2 | 169,166 | 3.0 |
| Comparative Example 4 | PLA | 100 | 0 | — | — | — | 99385 | — |
| Comparative Example 5 | PCL | 0 | 100 | — | — | — | 207952 | — |

TABLE 2

Mechanical properties of molded article

| | Young's modulus (MPa) | Tensile strength (MPa) | Rupture elongation (%) | Amount-of-work-holding rate (%) | Permanent strain (%) |
|---|---|---|---|---|---|
| Example 1 | 2.07 | 10.6 | 1477 | 60.5 | 14 |
| Example 2 | 2.45 | 27.3 | 1407 | 58.0 | 20 |
| Example 3 | 2.43 | 21.2 | 1273 | 55.8 | 12 |
| Example 4 | 2.38 | 44.4 | 1514 | 61.8 | 12 |
| Example 5 | 2.68 | 33.7 | 1138 | 57.5 | 20 |
| Example 6 | 2.98 | 17.0 | 831 | 65.5 | 15 |
| Comparative Example 1 | 28.6 | 21.8 | 1032 | 44.6 | 27.0 |
| Comparative Example 2 | 25.4 | 23.4 | 421.5 | 38.9 | 21.0 |
| Comparative Example 3 | 46.6 | 13.0 | 316.8 | 19.0 | 40.0 |
| Comparative Example 4 | 866 | 249 | 209.0 | 15.0 | 83.0 |
| Comparative Example 5 | 3563 | 394 | 142.7 | 13.8 | 80.0 |

INDUSTRIAL APPLICABILITY

The medical molded product according to the present invention can be applied to, but is not limited to, ligatures, sutures, suture needles, anti-adhesion films, nervous damage protective films, nerve guidance conduits, and the like used during surgery.

The invention claimed is:

1. A medical molded article comprising a bioabsorbable polyester,
    the medical molded article having an amount-of-work-holding rate of 55% or more,
    the amount-of-work-holding rate defined as a rate of an amount of work generated finally by an operation that is repeated 10 times to an amount of work generated first by the operation,
    the operation in which a tensile stress is applied to the medical molded article in a direction of a maximum length of the medical molded article to generate a tensile strain of 100% with respect to an initial length;
    wherein the bioabsorbable polyester comprises a polyester copolymer including a hydroxycarboxylic acid residue and a lactone residue as main structural units;

wherein the hydroxycarboxylic acid residue comprises a lactic acid residue, and the lactone residue comprises a caprolactone residue;

wherein the polyester copolymer comprises a multimerized macromer;

wherein the multimerized macromer has a gradient structure; and wherein the multimerized macromer has a structure in which a plurality of molecular chains are repeated that have a gradient structure having a composition gradient of the hydroxycarboxylic acid residue and the lactone residue in the molecular chains.

2. The medical molded article according to claim 1, wherein the amount-of-work-holding rate is 60% or more.

3. The medical molded article according to claim 1, wherein at least one of the hydroxycarboxylic acid residue or the lactone residue of the bioabsorbable polyester has a crystallization rate of less than 14%.

4. The medical molded article according to claim 1 having a Young's modulus of 10 MPa or less and a tensile strength of 5 MPa or more, the Young's modulus and the tensile strength that are measured in accordance with JIS K6251 (2010).

5. The medical molded article according to claim 4, wherein the Young's modulus is 0.1 MPa or more.

6. The medical molded article according to claim 1 having a rupture elongation of 200% or more, the rupture elongation measured in accordance with JIS K6251 (2010).

7. The medical molded article according to claim 1, wherein the bioabsorbable polyester is included at a content of 80% by weight or more.

8. The medical molded article according to claim 1 having a film form, a fiber form, or a tube form.

9. A medical device to be placed inside or outside a living body, the medical device comprising the medical molded article according to claim 1.

10. A nerve guidance conduit comprising the medical molded article having a tube form, the medical molded article according to claim 8.

* * * * *